Aug. 17, 1954  D. W. MOORE, JR  2,686,698
BEARING
Filed Feb. 11, 1954
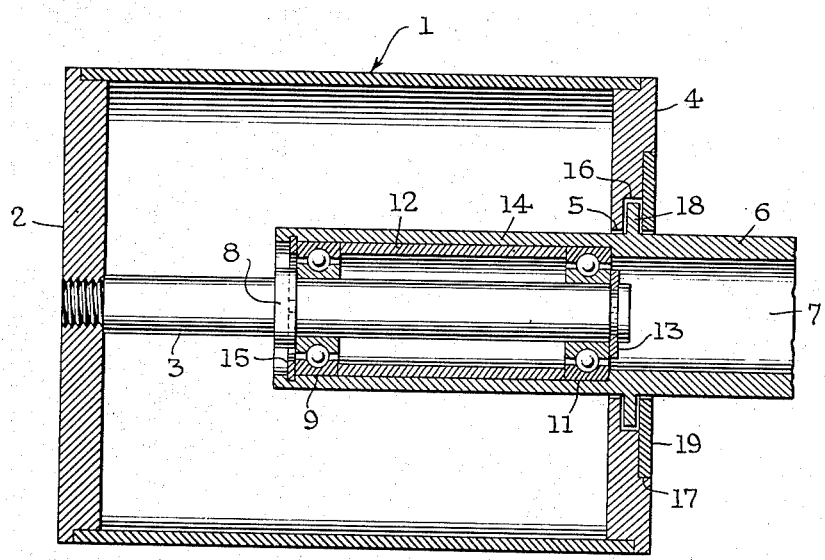
INVENTOR
David W. Moore, Jr.
BY
ATTORNEYS

UNITED STATES PATENT OFFICE 2,686,698

BEARING

David W. Moore, Jr., Pacific Palisades, Calif., assignor to Servomechanisms, Inc., Westbury, N. Y., a corporation of New York Application February 11, 1954, Serial No. 409,743

1 Claim. (Cl. 308—189)

This invention relates to bearings. Specifically, it relates to bearings suitable for use in precision instruments.

In the design of precision instruments, the designer constantly faces the problem presented by the conflicting requirements of high sensitivity and accuracy on one hand and durability on the other. The present invention relates to bearing means intended for use in connection with a rotary sensing member, although it will be understood that this is not the only use to which the invention can be put. Such a bearing must have low friction so the sensing element may turn freely. It must be provided with adequate sealing means to prevent the entry of dust and other foreign matter. Finally it must be protected from damage which might result from the rotary element being struck or jarred.

According to the present invention, the bearing mounting comprising spaced ball bearings, the inner races of which are sustained on a cantilevered shaft and the outer races are received in a counterbore in the journalled member. This assembly is enclosed in a housing from which the journal projects. A labyrinth seal is provided between the housing and the journalled member. This construction incorporates the low friction and precision of ball bearings, but protects them against damage due to impact on the rotary member and against the entrance of dust and dirt. The cantilevered shaft is flexible and yields freely to loads on the rotary member. The labyrinth seal limits movement of the rotary member due to bending of the cantilevered shaft and most of the load is then transferred directly to the housing and the ball bearings are protected against damage.

The labyrinth seal inhibits the entrance of dust into the housing and the bearings are further protected by locating the end of the counterbored journal within the housing and remote to the aperture through which it extends.

The invention will be described having reference to the accompanying drawing of the preferred embodiment of the invention.

The invention comprises a generally cylindrical housing 1 having an end wall 2. A cantilevered shaft 3 is threaded into the end wall 2 and extends through the housing 1. The other end of the cylindrical housing 1 is closed by an end wall 4 having a central aperture 5 therein. A journalled member 6 extends inward through the aperture 5. The journalled member is provided with a counterbore 7 which is arranged coaxially with the cantilevered shaft 3.

The shaft 3 is provided with an annular shoulder 8 as shown. Two ball bearings 9 and 11 are mounted on the shaft 3. The inner race of the bearing 9 bears against the shoulder 8. A cylindrical sleeve like spacer 12 extends between the outer races of the bearings. A split retainer ring 13 reacts against the outer face of the inner race of the bearing 11. The outer races of the bearings 9 and 11 are received in an enlarged portion 14 of the counterbore 7 and a snap ring 15 holds them in assembled relation.

The aperture 5 is provided with a counterbore 16 and a larger counterbore 17. The journalled member 6 is provided with an encircling flange 18, the outer diameter of which is slightly less than the diameter of counterbore 16. The thickness of the flange 18 is less than the depth of the counterbore 16.

An annular closure plate 19 is pressed into the counterbore 17, the inner diameter of the plate 19 being slightly greater than the outer diameter of the journalled member 6. It will be seen that the flange 18 and the counterbore 16 and the plate 19, when in their assembled relation, provide a labyrinth type of seal between the interior of the housing 1 and the outside atmosphere. It should be noted that clearance is provided between the flange 18 and the end wall 4.

The particular advantages of the illustrated construction are that the journalled member 6 is free to rotate with the low friction characteristic of ball bearings and at the same time the precision ball bearings are protected against damage from impacts against the journalled member since it strikes against the housing 1 after slight displacement. This transfers the shock loading from the bearings to the housing 1.

The easy displacement of the journalled member 6 results from mounting shaft 3 as a cantilever and locating the bearings near its free end. The labyrinth seal which is afforded between the journalled member 6 and the end wall 4 does not increase the frictional resistance to rotation of the member 6 because in their normal operating position positive clearance is afforded between these parts. It does however, inhibit the entry of dust and other foreign material into the housing 1. Further, the location of the inner end of the journalled member 6 at a point in the housing which is remote to the aperture 5 provides additional protection to the bearings against the entry of dirt or dust because this material must travel the length of the journalled member 6 before it can come into contact with the bearings.

I claim:

A bearing structure comprising in combination a housing having an aperture therein; a cantilevered shaft mounted therein and alined with said aperture; a counterbored shaft having one end extending inward through said aperture, the counterbore being coaxial with the cantilevered shaft and encircling it through at least a portion of its length; ball bearings with their outer races sustained in the counterbore and their inner races carried by the cantilevered shaft; and labyrinth sealing means between the counterbored shaft and the aperture.

References Cited in the file of this patent

UNITED STATES PATENTS

| Number | Name | Date |
|---|---|---|
| 2,384,005 | Bell | Sept. 4, 1945 |
| 2,518,159 | Martin | Aug. 8, 1950 |

FOREIGN PATENTS

| Number | Country | Date |
|---|---|---|
| 211,982 | Germany | July 20, 1909 |